March 23, 1948.  C. L. SLINGERLAND  2,438,304
SLICING DEVICE WITH A VERTICALLY RECIPROCATING CUTTER
Filed Dec. 13, 1946
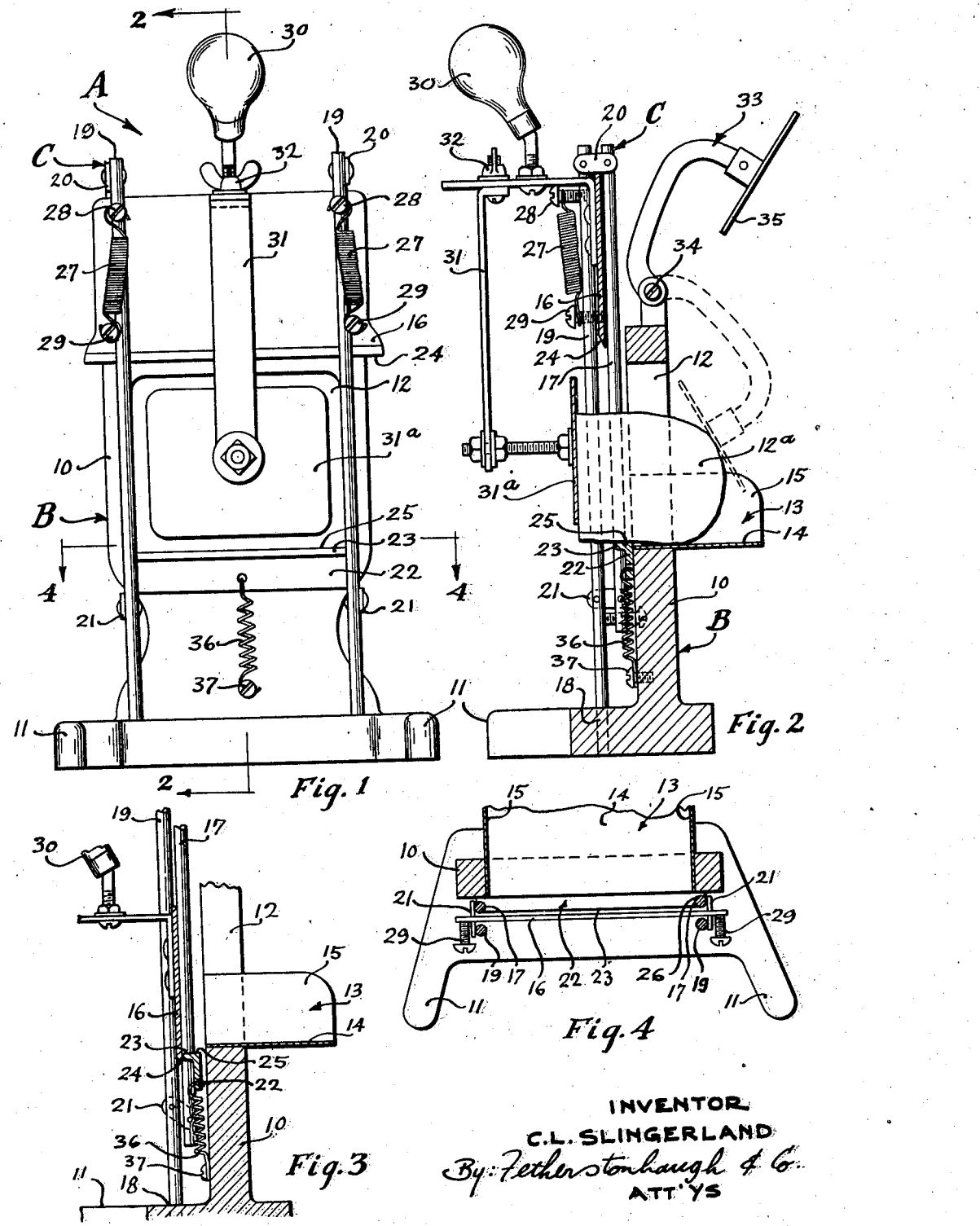
INVENTOR
C.L. SLINGERLAND
By Fetherstonhaugh & Co.
ATT'YS Patented Mar. 23, 1948

2,438,304

UNITED STATES PATENT OFFICE 2,438,304

SLICING DEVICE WITH A VERTICALLY RECIPROCATING CUTTER

Charles Lloyd Slingerland, Niagara-on-the-Lake, Ontario, Canada

Application December 13, 1946, Serial No. 716,019

5 Claims. (Cl. 146—158)

This invention relates to a device for chopping food and the like of the general class in which a blade reciprocates between spaced apart guide ways to coact with the edge of a ledge over which the material to be cut is projected to cut off the projecting portion.

Food choppers having a food ledge and a blade adapted to reciprocate between guides in advance of the ledge to coact with the ledge and chop off the portion of food which overhangs the ledge have been known in the past. In these, however, the guides are rigidly mounted, and have to be spaced apart a considerable distance so as to allow the blade to freely reciprocate without too much friction. There is therefore, a considerable amount of play between the guides and the blade, and the blade can not coact with the ledge over which the food is projecting to make a clean cut. I have invented a superior food chopper of this class which overcomes this disadvantage and has other advantages.

It is, therefore, an object of this invention to provide a food chopper having a blade adapted to reciprocate between guide ways in which the play between the guides is reduced as the blade cuts through the food to cause the blade to coact with an edge of a food ledge to cleanly cut off the food which overhangs the ledge.

It is also an object of this invention to provide a food chopper having the above characteristics in combination with means for automatically guaging the thickness of the slices and means for feeding the food into the chopper.

With these and other objects in view, the invention generally comprises a blade adapted to reciprocate between spaced apart guides which are mounted on a frame so as to chop a material herein referred to as food, which overhangs a ledge in the path of the reciprocating blade. The guides on one side of the blade are rigidly mounted on the frame and the guides on the opposite side of the blade are pivotally connected to the rigidly mounted ones. The food ledge referred to above is rigidly connected to the latter mentioned guide members below the connections joining the spaced apart guides on each side of the blade so that the above mentioned pivotal connection will operate when pressure is exerted on the ledge to cause the spaced apart guides to come closer together and permit an edge of the ledge to move towards and coact with the blade as it passes the ledge to cut off the portion of the food which overhangs the ledge. Pressure is exerted on the ledge through the food as the blade engages the portion of the food which projects past the ledge in the path of the blade.

In the preferred embodiment of the invention the chopper also includes a gauge to gauge the amount which the food projects over the ledge to automatically regulate the thickness of the slices which are being chopped and a feeder member adapted to push the food against the gauge.

Referring to the drawings, A designates the device as a whole having a frame B and an assembly C to guide the cutting blade in a reciprocating motion to slice food or the like in a uniform manner.

The invention will be clearly understood after reference to the following detailed specification taken in conjunction with the drawings.

In the drawings:

Fig. 1 is an end view of the chopper showing the mounting of the reciprocable blade in the guideways.

Fig. 2 is a sectional view of Fig. 1, along the line 2—2 showing the chopper in operative position.

Fig. 3 is a sectional view showing a portion of the parts shown in Fig. 2 as the blade coacts with the ledge to cut off the portion of the food which overhangs the ledge.

Fig. 4 is a sectional view taken along the line 4—4 of Fig. 1.

Referring to the drawings A indicates the device as a whole having a frame B adapted to support a spaced apart guide structure C for guiding a blade in a reciprocating movement to chop food positioned in its path.

The details of these parts are as follows:

In the embodiment shown, the frame C has an upright portion 10 and two feet 11 adapted to support it on a table in an upright position. The upright portion 10 has a rectangular opening 12 in it through which the food to be chopped is passed. A food guide 13 having its bottom surface 14 aligned with the bottom of the rectangular opening 12 and flanges 15 extending up the sides of the opening 12 projects from one side of the rectangular opening 12 to guide the food through the chopper. A potato 12a is shown in the drawings in the process of being chopped.

The guide structure C which is adapted to guide a blade 16 past the opening 12 to chop off a portion of food which projects through the opening comprises the guides 19 rigidly mounted on the frame adjacent one end as at 18, and the guides 17, spaced apart from the guides 19 which are pivotally connected to the guides 19 adjacent their free ends by means of the similar links 20 and 21. A ledge 22 having an edge 23 adapted to coact with the cutting edge 24 of the blade 16 as it reciprocates to perform a cutting operation and a surface 25 adapted to substantially align with the bottom surface of opening 12 is rigidly secured to the guideways 17 as at 26.

From the description this far, it will be apparent that as pressure is exerted on the surface 25 of the ledge 22, the guides 17 will move in a downward direction and the space between them will decrease, as pivotal connections of links 20 and 21 are caused to turn in an anti-clockwise direction as viewed in Figs. 2 and 3. It will also be apparent that as the blade 16 moves downwards between the guideways 17 and 19 to engage the portion of the potato 12a which projects past the ledge 22, that such a downward pressure will be exerted on the ledge 22 so that as the blade cuts into the projecting portion of the potato 12a the space between the guideways will decrease.

The links 20 and 21 when in the position shown in Fig. 2, are designed to hold the guides 17 and 19 apart a sufficient degree to permit the blade 16 to reciprocate freely with very little friction. As pressure is exerted on the ledge when food is being sliced, the links 20 and 21 are operated to the position shown in Fig. 3 to cause the edge 23 of ledge 22 to frictionally engage the cutting edge 24 of the blade 16 and to cleanly cut off the projecting portion of the potato. Thus by providing guideways which are widely spaced apart to permit free movement during the major part of the reciprocation of the blade and which approach each other as the blade approaches the ledge over which the food to be cut projects, I have provided a food chopper which will operate freely and in which the blade will coact with the ledge to cut off the projecting portion very cleanly.

The blade 16 is preferably spring held towards the upper end of the spaced apart guides 17 and 19 by means of springs 27, connected between screws 28 fixed to the rigid guides 19 and screws 29 fixed to the blade 16. A handle 30 is mounted on the blade 16 by means of the bracket 31 for the purpose of reciprocating the blade between the guideways, and a gauge 31a to limit the distance that the food projects over the ledge 22 is adjustably mounted on the bracket 31 by means of the wing nut and bolt 32 which is adapted to slide in a slot in the bracket 31 (not shown in drawing) which extends parallel to the length of the bracket.

A feeding member 33 pivotally connected to the frame as at 34, has a plate 35 adapted to bear against the food being chopped to push it against the gauge 31a and position it in the path of the reciprocating blade 16 is also preferably included in the preferred embodiment of the invention.

A spring 36, hooked on to the lower portion of the ledge 22 and secured to the stationary frame 10 by the screw 37, has a tention adapted to prevent the ledge 22 from rising too high above the bottom of the opening 12 as the blade 16 is raised.

The operation of the preferred embodiment of the invention then is this: Food is fed through the opening 12 through the guide 13 and is urged against the gauge 31a by the feed member 33. The blade 16 is depressed in the guideways 17 and 19 by the handle 30 to cut into the portion of the food which projects over the ledge 22, and the guideways 17 and 19 approach each other so that the blade 16 will coact with the edge 23 of the ledge 22 to cut off the projecting portion of the food as explained above. As pressure is released on the handle 30 the springs 27 will cause the blade 16 to resume its former position. The guideways will become spaced apart again as the ledge 22 is raised, partly due to the frictional engagement between the side of the upwardly moving blade and the ledge 22, and partly due to the action of the upwardly moving blade striking the link member 20 as it reaches its upward extremity. The spring 36 prevents the ledge from rising too far above the level of the bottom of the opening 12. A constant pressure is exerted on the feeder member 33 so that as the blade is raised after cutting off the projecting portion of the food a new part is forced over the ledge 22 against the stop member 31a to be cut off by the next stroke of the blade. Thus the cutter quickly and automatically slices or chops the food in uniform slices.

I have described the invention as a food cutter but it will be apparent that the invention could be used to cut any material which it is desired to chop or slice. Changes and modifications in the embodiment of the invention shown will be apparent to those skilled in the art. It is therefore, not intended that the specification should be read in a limiting sense except for the limitations expressed by the following claims.

What I claim as my invention is:

1. In a chopper of the class described a frame, a blade, guides spaced apart to guide the blade between them in a reciprocating movement, the guides on one side of said blade being rigidly mounted on said frame, pivotal connections connecting said rigidly mounted guides to the guides on the opposite side of said blade adjacent the free end of the rigidly connected guide, a ledge to hold the material to be chopped rigidly connected to said latter mentioned guides said ledge having an edge adapted to coact with said blade as it reciprocates between said guideways to shear off the portion of the material being chopped which overhangs said ledge in the path of said blade, said guides carrying said ledge being connected to said rigidly connected guides beyond said pivotal guide connections so that as pressure is exerted on said ledge by the blade through the material being chopped, said guides carrying said ledge will move towards said rigidly connected guides to cause said blade to coact with the edge of said ledge to make a sharp cut.

2. In a chopper of the class described, a frame, a blade, guide spaced apart to guide the blade between them in a reciprocating movement, the guides on one side of said blade being rigidly mounted on said frame, link means connecting said rigidly mounted guides to the guides on the opposite side of said blade adjacent the free end of the rigidly connected guide, a ledge to hold the material to be chopped rigidly connected to said latter mentioned guides, said ledge having an edge adapted to coact with said blade as it reciprocates between said guideways to shear off the portion of the material being chopped which overhangs said ledge in the path of said blade, said guides carrying said ledge being connected to said rigidly connected guides so that, as pressure is exerted on said ledge by the blade through the food, said guides carrying said ledge will move towards said rigidly connected guides to cause said blade to coact with the edge of said ledge to make a sharp cut.

3. In a chopper of the class described, a frame, a blade resiliently mounted in said frame, guides spaced apart to guide the blade between them in a reciprocating movement, the guides on one side of said blade being rigidly mounted on said frame, pivotal means connecting said rigidly mounted guides to the guides on the opposite side of said blade adjacent the free end of the rigidly connected guides, a ledge to hold the material to be chopped rigidly connected to said latter mentioned guides said ledge having an edge adapted to coact with said blade as it reciprocates between said guideways to shear off the portion of the material being chopped, which overhangs said ledge in the path of said blade, said guides carrying said ledge being connected to said rigidly connected guides so that, as pressure is exerted on said ledge by the blade through the food, said guides carrying said ledge will move towards said rigidly connected guides to cause said blade to coact with the edge of said ledge to make a sharp cut.

4. In a chopper of the class described, a frame having an opening adapted to pass the material to be chopped, blade guides spaced apart to guide the blade between them in a reciprocating motion across and in advance of said opening, the guides on the side of said blade, remote from said opening, being rigidly mounted on said frame pivotal connections connecting said rigidly mounted guides to the guides on the opposite side of said blade, a ledge adapted to receive the food to be chopped rigidly connected to said latter mentioned guides and slightly in advance of said opening, said ledge having an edge adapted to coact with said blade as it reciprocates between said guideways to shear off the portion of the material being chopped, which overhangs said ledge in the path of said blade, said guides carrying said ledge being connected to said rigidly connected guides so that, as pressure is exerted on said ledge by the blade through the food, said guides carrying said ledge will move towards said rigidly connected guides to cause said blade to coact with the edge of said ledge to make a sharp cut.

5. A device for chopping food as claimed in claim 4 having a feeding member pivotally connected to said frame and adapted to force the food into the path of said blade, and a stop member adjustable to assume a position in advance of said reciprocating blade to regulate the thickness of the pieces of the material being chopped.

CHARLES LLOYD SLINGERLAND.